June 2, 1925.
D. C. PETREE
PIPE EXTRACTOR
Filed Jan. 26, 1925
1,540,566
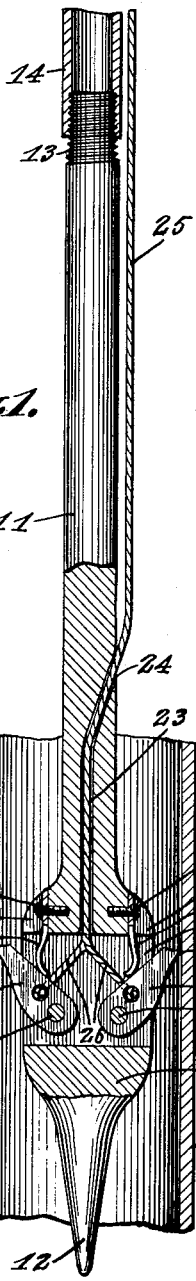
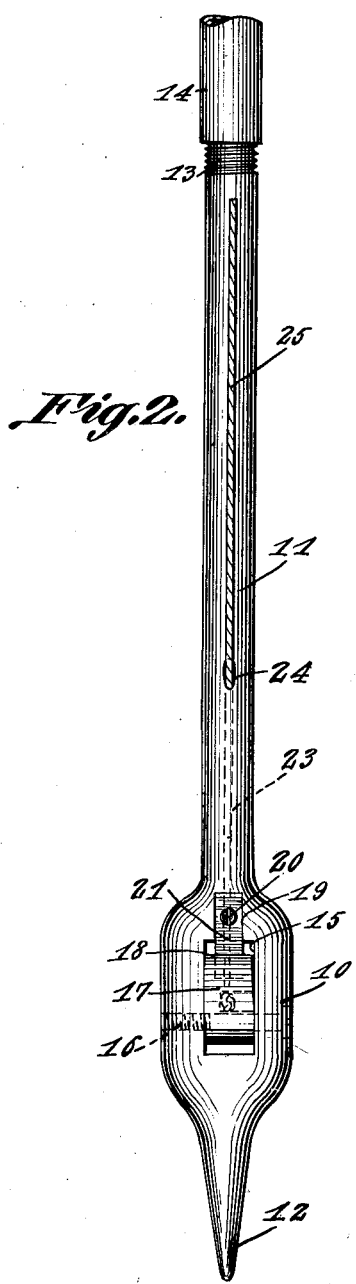
Donald C. Petree, INVENTOR.
BY
Geo. P. Kimmel, ATTORNEY.

Patented June 2, 1925.

1,540,566

UNITED STATES PATENT OFFICE.

DONALD C. PETREE, OF CLARENCE, MISSOURI.

PIPE EXTRACTOR.

Application filed January 26, 1925. Serial No. 4,928.

*To all whom it may concern:*

Be it known that I, DONALD C. PETREE, a citizen of the United States, residing at Clarence, in the county of Shelby and State of Missouri, have invented certain new and useful Improvements in Pipe Extractors, of which the following is a specification.

This invention relates to grapple or fishing device for removing pipes or curbings from wells, such as oil wells, artesian wells, and the like, and has for one of its objects to improve and simplify the construction and increase the efficiency and utility of devices of this character.

With these and other objects in view the invention consists in certain novel features of construction as hereinafter shown and described and then specifically pointed out in the claims, and in the drawings illustrative of the preferred embodiment of the invention—

Figure 1 is a sectional side elevation of the improved implement applied.

Figure 2 is an edge view of the same.

The improved implement includes a body portion 10 and a shank portion 11 with a point 12 extending from the body 10, as shown.

The shank 11 is smaller than the body 10 and relatively long, and threaded at the upper end as shown at 13 to receive a tubular pull rod 14, the latter preferably of sections of gas piping, the number of sections depending on the depth of the well, or the distance below the surface of the pipe to be grappled.

Formed transversely through the body 10 is an opening 15, and pivoted at 16 in the opening are reversely directed and operative gripping fingers or dogs 17, each dog terminating in a chisel point 18.

Formed in the opposite faces of the body 10 are recesses or seats 19, and secured by a screw or other fastening device 20 in each recess is a flat spring 21, the latter bearing by their free ends respectively upon the dogs 17, as shown in Figure 1, and operative to hold the dogs yieldably in projected position, and to press the chisel points against the inner face of the pipe to be grappled, a portion of the pipe being represented at 22.

The body 10 and stock 11 are integral, and provided with a cable guideway formed with a portion 23 extending longitudinally of the body and stock and communicating at one end with the opening 15 and with an obliquely directed portion 24 connecting the longitudinal portion with exterior of the stock, as represented in Figure 1.

A pull cable 25 is extended through the guideway 23—24, and divided within the opening 15 as shown at 26, and the divided portions connected respectively to the gripping dogs 17.

When a pipe is to be grappled the improved device is lowered into the well until it is within the pipe, the dogs by their form and location permitting the implement to pass down into the pipe, but at any attempt to withdraw the implement, the dogs will be distended by the action of the springs 21, and firmly grip the pipe 22, and any upward pull upon the coupled gas pipe sections 14 will result in drawing the pipe 22 from the well, the greater the resistance the greater will be the grip.

If occasion arises to release the grip of the dogs, this can easily be accomplished by an upward pull on the cable 25, as will be obvious.

The improved implement is simple in construction, can be inexpensively manufactured and of any required size or capacity.

The body 10, shank 11 and point 12 will be integral, and preferably of cast steel to insure the requisite strength.

The springs 21 being entirely embedded in the recesses 19, are protected from contact from outside objects.

The point 12 operates to protect the body and dogs from contact with objects which may be located within the pipe.

The springs being separately held in place, a broken spring may be renewed without disturbing the other spring.

The reduced point 12 operates to guide the body with its dogs into the open upper end of the pipe to be grappled.

The pull member 25 being located for a portion of its length entirely within the body and stock, is protected from abrasion by contact with the walls of the pipe.

The preferred embodiment of the invention is disclosed in the drawings and set forth in the specification but it will be understood that modifications within the scope of the claimed invention may be made in the construction without departing from the principle of the invention or sacrificing any of its advantages.

Having thus described the invention, what I claim as new is:

1. An implement of the class described comprising a body having a pointed portion extending from one end and a reduced shank extending from the other end, said body having a transverse opening therethrough and said shank having a cable guideway therein communicating with the body opening, reversely operating grip members pivoted within the opening and withdrawable within the lines of the same, and a pull cable connected to the grip members and extending through the guideway.

2. An implement of the class described comprising a body having a reduced shank extending from one end, said body having a transverse opening therethrough and outwardly opening recesses communicating with the opening and said shank having a cable guideway therein communicating with the body opening, reversely operating grip members pivoted within the opening and withdrawable within the lines of the same, a spring secured to the body within each of said recesses and constantly engaging respectively with said grip members, and a pull cable connected to the grip members and extending through the guideway.

3. In a device of the class described, a stock having a transverse opening and vertically directed seats in the opposite faces of the stock and communicating with the transverse opening and with a guide channel communication with the opening, grip devices pivoted within said opening and withdrawable entirely within the lines of the same, a spring secured in each of said seats and constantly engaging said grip members, said springs being disposed wholly within the lines of the stock, and a pull member attached to said grip devices and extending through the guide channel.

In testimony whereof, I affix my signature hereto.

DONALD C. PETREE.